United States Patent Office 3,597,367
Patented Aug. 3, 1971

3,597,367
COORDINATION CATALYSTS FOR ALPHA-OLEFIN POLYMERIZATION
David Apotheker, Wilmington, Arthur L. Barney, Deerhurst, Wilmington, and Nicolas Brodoway, Claymont, Del., assignors to E. I. du Pont de Nemours and Company, Wilmington, Del.
No Drawing. Filed Mar. 25, 1968, Ser. No. 715,553
Int. Cl. C08f *15/04, 15/40*
U.S. Cl. 252—429          7 Claims

ABSTRACT OF THE DISCLOSURE

A catalyst system particularly useful in alpha-olefin copolymerization is prepared by the admixture of an ether complex of aluminum borohydride; selected organic-soluble halovanadium compounds such as vanadium oxytrichloride; and a selected Lewis acid, such as aluminum tribromide or aluminum trichloride. Solubility of the aluminum trichloride can be enhanced by pretreatment with an alkyl halide, such as 1-iodoethane. The catalyst may be formed separately or in situ in the polymerization reaction mixture.

FIELD OF THE INVENTION

This invention relates to a catalyst system for polymerization of alpha-olefin monomers, and more particularly to a catalyst system for ethylene/propylene copolymerization and ethylene/propylene/non-conjugated diene copolymerization.

BACKGROUND OF THE INVENTION

In recent years, alpha-olefin polymers have gained widespread use in a variety of industrial and commercial applications. With increasing importance of such polymers has come increased interest in provision of catalyst systems for the production of alpha-olefin polymers.

One desirable property of catalyst systems for alpha-olefin polymerization, it has been found, is catalyst solubility. Since the activity and hence efficiency of a particular catalyst system depend to a great extent on its ability to contact the reactant solution, soluble catalysts are eminently desirable. Such catalysts present almost unlimited "surface area" for contact. However, in the past many catalysts employed in alpha-olefin polymerization have been either solid or heterogeneous with respect to phase.

Solubility of catalyst systems is desirable for other reasons. For example, use of soluble catalysts permits a high degree of reproducibility of results. Again, where it is desired to produce an amorphous elastomeric polymer such as a copolymer of ethylene/propylene/non-conjugated diene, catalyst solubility is important. Where the catalyst presents crystalline surfaces by reason of its heterogeneity, orientation of the monomer units is enhanced, contributing to formation of a polymer having undesirable crystallinity. Where the polymer product is intended for elastomeric use, crystalline, or "blocky" portions of the elastomer will induce discontinuities in the vulcanized elastomer.

In the production of relatively non-crystalline polymers such as elastomers, polymer solubility is another important consideration. Insoluble product can lead to heavy deposition in plant process streams. Moreover, polymer insolubility is an indication that, to the extent of the insolubility, the elastomeric polymer product is less amorphous and more crystalline. Accordingly, one desirable characteristic in a catalyst system intended for elastomer production is the ability to produce soluble polymer.

Inherent viscosity of the polymer produced is a third significant consideration. Where viscosity of the polymer is too great, difficulty may be experienced in, for example, milling the polymer or dispersing addends in it. On the other hand, if viscosity is too low desired properties of cohesiveness are lost. Elastomeric products having inherent viscosity from about 1 to 6 are commercially practicable; although the higher viscosity elastomers, e.g., inherent viscosity of from about 4 to 6, may be limited in their application for that reason. Normally, it is preferred that elastomeric products have inherent viscosities of about 2 to 4. Because inherent viscosity depends to a great extent on the catalyst system employed, the desirability of a catalyst system capable of reproducibly making polymer of inherent viscosity within the above limits is apparent.

SUMMARY OF THE INVENTION

According to this invention there are provided coordination catalyst systems comprising:

(a) An organic soluble alkyl, cycloalkyl and alkaryl ethereal complexes of aluminum borohydride;

(b) An organic-soluble halovanadium compound selected from the group consisting of vanadium tetrachloride, vanadium oxytrichloride, vanadium dichloro-bis-acetylacetonate, vanadium dibromo-bis-acetylacetonate, vanadium trichloride:3 tetrahydrofuran, $VCl_m(OC_nH_{2n+1})_{4-m}$ wherein $m$ is an integer from 1 to 3 and $n$ is an integer from 2 to 8, $VOCl_m(OC_nH_{2n+1})_{3-m}$, wherein $m$ is an integer from 1 to 2 and $n$ is an integer from 2 to 8, and mixtures thereof; and (c) A Lewis acid selected from the group consisting of aluminum trichloride, aluminum tribromide, and niobium pentachloride. The solubility of the aluminum trichloride may be enhanced by pretreatment with a primary or secondary alkyl halide wherein the halide is bromine, chlorine, or iodine and the alkyl portion has from one to about 18 carbon atoms. The borohydride and the halovanadium compound are mixed prior to addition of the Lewis acid thereto, and the molar ratio aluminum borohydride/vanadium/Lewis acid is 0.1–1.2/1/1–5.

Catalyst systems of the instant invention are characterized by high solubility and efficiency, effectiveness even at low temperature and pressure, and the ability to produce high yields of soluble copolymer of optimal inherent viscosity. The catalyst requires no support and may be made either separately or in situ in the hydrocarbon polymerization medium.

DESCRIPTION OF THE INVENTION

The borohydridic component of the novel catalyst system can be either zirconium borohydride, or aluminum borohydride in the form of an ethereal complex. Complexation of the aluminum borohydride markedly decreases its volatility, thereby improving processing safety. The complex preferred for economic reasons is the diethyl ether complex. Other suitable ether complexes of the aluminum borohydride include the alkyl ethers having in each alkyl radical from 1 to about 20 carbon atoms, such as diiso-amyl ether, di-n-butyl ether, di-n-amyl ether, diisopropyl ether, n-butyl ethyl ether, di-n-hexyl ether, and n-propyl iso-propyl ether, cycloalkyl ethers having in each cycloalkyl radical from about 5 to 7 carbon atoms such as dicyclohexyl ether and dicycloheptyl ether; mixed alkaryl ethers having from about 1 to 20 carbon atoms in the alkyl portion and from about 6 to 20 carbon atoms in the aryl portion such as methyl phenyl ether, ethyl phenyl ether, ethyl-m-methylphenyl ether, and n-propyl phenyl ether; and mixtures thereof. Oxygen-containing heterocyclic alternatives such as tetrahydrofuran and tetrahydropyran are also suitable for complexing aluminum borohydride according to this invention, and are intended to be included in the term "ether" as used herein.

The borohydridic components of the instant catalyst can be prepared by any method desired and known to the art. For example, a zirconium compound such as a halide may be reacted with a borohydride of an alkali or alkali earth metal to form the zirconium borohydride. The preparation of zirconium borohydride is disclosed by Reid et al. in J. Elec. Soc. 104, at 21 (1957). The ether complexes may be prepared by distilling aluminum borohydride into a flask containing the ether cooled to about −65° C., or by any other convenient technique known to the art. Preparation of aluminum borohydride itself may follow the procedure of Schlesinger et al., described in J. Am. Chem. Soc. 75, at 209 (1953).

A second component of the catalyst system is a vanadium compound containing a halogen ligand. Halovanadium compounds employed in the catalyst include vanadium tetrachloride anod oxytrichloride; vanadium-dihalo-bis-acetylacetonate wherein the halogen is either bromine or chlorine; vanadium trichloride:3 tetrahydrofuran complex; alkoxy-chlorovanadium compounds of the formula $VCl_m(OC_nH_{2n+1})_{4-m}$, wherein $m$ is an integer from 1 to 3 and $n$ is an integer from 2 to 8 such as $VCl_2(OC_2H_5)_2$ and $VCl_3(OC_3H_7)$; and alkoxy-oxychlorovanadium compounds of the formula $VOCl_m(OC_nH_{2n+1})_{3-m}$, wherein $m$ is an integer from 1 to 2 and $n$ is an integer from 2 to 8, such as $VOCl_2(OC_2H_5)$ and $VOCl(OC_3H_7)_2$. For the purposes of this invention, vanadium tetrachloride and vanadium oxytrichloride are preferred. Each of the above-listed halovanadium compounds is known and may be obtained commercially or prepared by conventional techniques.

The Lewis acid component of the invention can be aluminum tribromide or trichloride, niobium pentachloride, or mixtures thereof; and serves a variety of functions. The vanadium component is activated by the presence of Lewis acid, which is required for adequate catalytic activity even where the borohydridic component of the catalyst is the aluminum species and borohydride exchange to vanadium is relatively rapid. Where the vanadium component contains oxygen or alkyl ligands, the activation effect of Lewis acid is particularly significant. Moreover, the catalyst formed from the complexed aluminum borohydride is wholly insoluble when made in the absence of Lewis acid. The Lewis acid materially assists in borohydride exchange from zirconium. Generally, as the Lewis acid proportion decreases, catalyst solubility decreases and catalyst decay increases. It has also been found that upon decreasing Lewis acid proportions, ethylene/propylene copolymers tend increasingly to become blocky or crystalline polymers having long runs of adjacent ethylene units, even where the polymer contains as much as 55–65% propylene by weight. When this occurs, desirable rubber-like properties are diminished or lost. The significance of the Lewis acid in the novel catalyst systems of this invention is apparent from the above.

In a preferred embodiment aluminum trichloride is solubilized by mixing with an alkyl halide before addition of the trichloride to the polymerization mixture. To make solubilized aluminum trichloride, one merely mixes the trichloride with an amount of alkyl halide at least sufficient to dissolve it. The aluminum trichloride must be dissolved by alkyl halide before being added to the polymerization mixture, since otherwise alkyl halide will not be able to solubilize it.

Alkyl halides suitable for use include primary and secondary halides, and the term "alkyl halide" as hereinafter used refers exclusively to such halides. Tertiary halides are too unstable for convenient use. The alkyl halide normally contains from 1 to about 18 carbon atoms, but only considerations of cost, availability, and the like determine an upper limit to the number of carbon atoms.

The halide portion of the alkyl halide can be bromine, chlorine, or iodine. The alkyl chlorides and bromides are better for solubilization of the aluminum trichloride, but catalysts prepared using them yield strongly cationic polymerizations giving undesirably soft and oily polymers. Such polymers are useful, for example, in caulking compounds; however, for the purposes of this invention the alkyl iodides are preferred, and polymers resulting from their use are free of the undesirable characteristics listed above.

What happens to the aluminum chloride when solubilized with alkyl halide is not presently determinable. The aluminum chloride may exist in the form of a complex or some other bonded form. The term "alkyl halide-solubilized aluminum chloride" and the like as hereinafter used means merely that the aluminum trichloride has, prior to addition to the reactor, been mixed with at least sufficient alkyl halide to dissolve it. The alkyl halide-aluminum trichloride "mixture" is thus comprehended by the term. On the other hand, the unqualified term "aluminum trichloride" refers to use of that Lewis acid alone, unmixed or not treated with alkyl halide.

Exemplary alkyl iodides useful in the invention include 1-iodoethane (preferred), 1-iodobutane, 1-iodo-2-methylpropane, 1-iodo-3-methylbutane, 2-iodobutane, 1-iodohexadecane, 1-iodoheptane, 1-iodododecane, 2-iodooctane, and 1-iodooctadecane. Mixtures of alkyl iodides may also be employed.

When aluminum bromide, another preferred Lewis acid, is utilized, essentially complete copolymer solubility is obtained. Moreover, pronounced changes in the nature of the catalytic solution may be observed when aluminum tribromide is used. An induction period, often observed with systems containing other Lewis acids, has been eliminated by use of aluminum tribromide. An amber color is obtained on reduction of the vanadium species in the presence of the said aluminum bromide instead of the purple color otherwise observed, indicating more complete activation of vanadium (the amber color is also observed when alkyl halide-solubilized aluminum trichloride is employed). Finally, addition of aluminum tribromide results in markedly superior catalyst solubility even at relatively high vanadium concentrations.

Optimal relative proportions of the various catalyst components necessarily depend upon the particular species selected for each component, the monomers to be polymerized, and other processing parameters. Said relative proportions can be readily determined without undue experimentation, particularly in the light of the discussion following, wherein quantities are expressed in terms of moles unless otherwise indicated.

Normally it is preferred that sufficient borohydride be present to provide at least two moles of $BH_4$ per mole of vanadium. In actual practice, convenience may dictate a departure from this standard, in which case an excess of the borohydride is optimally supplied. It has been found that particularly where the borohydridic species is zirconium borohydride, use of an excessive relative amount of the selected Lewis acid causes an abrupt and undesirable drop in the inherent viscosity of the polymer. This effect on polymer viscosity is particularly evident where the concentration of selected Lewis acid in the solution is high. Excessive relative amounts of the Lewis acid also adversely affect catalyst efficiency, as manifested by decreased yields of polymer.

Molar ratios expressing approximate proportional ranges for several preferred embodiments are as follows: $Zr(BH_4)_4/VOCl_3/Lewis$ acid of 2–200+/1/1–16, preferably 2–4/1/4–8; $Zr(BH_4)_4/VCl_4/Lewis$ acid of 1–100+/1/0.25–4, preferably 1–2/1/1–2;

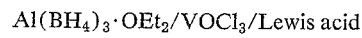

of 0.1–1.2/1/1.5, and preferably 0.4–0.9/1/2–3.

Generally the optimal aluminum trichloride (not solubilized by mixing with alkyl halide) requirement is about twice that of other Lewis acids. Thus for example, optimal aluminum trichloride requirements will tend to fall in the higher ends of the ranges above. Normally, borohydride is increased with increasing Lewis acid concentration, to avoid undue drop in polymer viscosity. In most cases where the complexed aluminum borohydride is employed in conjunction with vanadium tetrachloride, relative proportions of the latter will follow those shown above. However, since vanadium tetrachloride-containing catalysts are more susceptible to decay than those based on, for example, the oxytrichloride, slightly higher relative proportions of the former are desirable in batch copolymerization processes. The relative proportions for the case where the aluminum borohydride species is used are necessarily more restricted than for zirconium borohydride because unduly excessive amounts of the aluminum compound may cause reduction of vanadium to valences below those suitable for catalytic acitvity. On the other hand, where the zirconium compound is used, the relative proportions of the same are limited only by economic factors. As noted above, going above or below recommended Lewis acid proportions may result in abrupt drop in polymer inherent viscosity or catalyst solubility, respectively.

As used herein, the term "copolymerization" refers to addition polymerization involving two or more distinct molecular species. The molecule formed contains each molecular constituent, or an essential unit therefrom.

It has been found that the order of addition of catalyst components has a marked effect upon catalyst efficiency and the nature of the polymer prepared. Unsatisfactory catalysts are sometimes obtained where the selected Lewis acid is permitted to complex with the vanadium species prior to the addition of the borohydride. On the other hand, the addition of the vanadium component to a solution of the borohydridic species prior to that of the Lewis acid characteristically gives higher yields of polymer with higher intrinsic viscosity.

Vanadium concentrations in the reaction medium vary according to the borohydride employed. For the aluminum borohydride-ether based catalyst, vanadium concentration is from about 0.1 to about 10 millimoles per liter, preferably 0.25 to 4. Where the borohydride is of zirconium, the concentration of vanadium is from about 0.1 to about 2 millimoles/liter, and preferably from 0.25 to 0.5.

Polymerization reactions employing the novel halovanadium-borohydride-Lewis acid catalyst of the invention are carried out in the presence of a suitable hydrocarbon medium such as cyclohexane or tetrachloroethylene following conventional techniques employed in alphaolefin polymerization reactions. Media suitable for the reaction include, but are not limited to, alkanes and cycloalkanes having from about 3 to about 20 carbon atoms, such as pentane, hexane, 2-methyl butane, heptane, octane, decane, hexadecane, eicosane, and methyl-cyclohexane. Monomers to be polymerized may be added in liquid form, but it is preferable to sparge the gaseous monomer into the polymerization medium while agitating the reaction mixture vigorously. Unreacted monomer which escapes the reaction mixture can be readily recovered and returned thereto.

Monomers and the catalytic composition of this invention are contacted under conditions of time, temperature, pressure and the like sufficient to effect substantial conversion of said monomers to polymers or copolymers thereof. Of course, optimal reaction parameters will vary with the nature of the monomer feed stock, catalyst, desired product properties, etc. In general, temperatures from about 0° C. to 120° C. are suitable, while the most desired range is from about 25° C. to about 100° C. The preferred polymerization temperature is about 40° C. and external cooling can be employed to maintain the temperature of the exothermic reaction at that level. Polymerization can be carried out at subatmospheric, atmospheric, or superatmospheric pressures ranging up to thousands of pounds per square inch absolute depending upon temperature, volatility of the hydrocarbon medium and related considerations. Optimally, pressure is equal to or greater than 50 p.s.i.a.; that is, from about 50 p.s.i.a. to about 500 p.s.i.a. Reaction time will vary in relation to temperature, pressure, desired product properties, and the like. Optimal reaction times for each set of circumstances can be readily determined by the art-skilled. For batch operation under normal circumstances, residence times of from 30 minutes to 1 hour are preferred. Under continuous operating conditions, reaction times of from about 5 minutes to about 1 hour are generally preferred.

The polymerization can be carried out in standard equipment by techniques known to the art. An inert atmosphere, such as nitrogen, may be provided. When the polymer or copolymer has been formed, catalyst can be deactivated by methanol, steam, water, acid, or any conventionally employed compound containing active hydrogen. Polymer may be removed by methanol precipitation or other techniques known to the art. In the examples below, the invention is illustrated primarily in terms of certain preferred catalyst systems and polymer products. In addition to ethylene/propylene and ethylene/propylene/1,4-hexadiene, however, the instant catalysts are useful in polymerization of ethylene and copolymerization of ethylene/propylene/5-bromo-pentene, ethylene/1-butene, ethylene/1-hexene, ethylene/1,4-hexadiene, 1-hexene/6-methyl-1,5-heptadiene, ethylene/propylene/1-butene, and ethylene/propylene/non-conjugated dienes (EPDM) in which the diene is dicyclopentadiene; an alkenyl norbornene, such as butenyl norbornene; or an alkylidene norbornene, such as methylene or ethylidene norbornene. A particularly important EPDM polymer is ethylene/propylene/1,4-hexadiene.

Polymers manufactured by the catalyst of this invention can be subjected to such desired after-treatment as is desired to fit them for particular uses or impart desired properties. For example, the polymers may be extruded, molded, made sponge-like, and be modified with various pigments, fillers, stabilizers, antioxidants and the like. The polymer products may be employed in the production of wire and cable, automotive gaskets, protective coatings, industrial hose and belting, tire sidewalls, and many other areas.

The following examples illustrate the invention. All parts and percentages are by weight unless otherwise indicated; all examples are performed under atmospheric conditions of pressure. Inherent viscosity is measured herein with respect to 0.1 gram copolymer in 100 ml. tetrachloroethylene at 30° C.

Example 1

(A) A $Zr(BH_4)_4/VCl_4/AlBr_3$ coordination catalyst is used in ethylene/propylene copolymerization. The catalyst is produced in situ in the polymerization solution. To a one-liter reaction vessel, equipped with stirrer, thermometer, gas inlet and outlet tubes, is added one liter of tetrachloroethylene. The solvent is saturated at 20° C. with ethylene (1.0 liter/minute) and propylene (1.25 liter/minute). The temperature is maintained at 20° C. To the vessel are then added 0.5 ml. of $Zr(BH_4)_4$ solution in cyclohexane (3 g./100 ml. solution), 0.25 millimole $VCl_4$ (0.25 molar solution in tetrachloroethylene) and 0.1 g. $AlBr_3$ (in tetrachloroethylene, 2 g./100 ml. soln.).

The mole ratio $Zr(BH_4)_4/V/Lewis$ acid is approximately 0.4/1/1.5. Polymerization starts immediately; after it has been continued at 20° C. for 7.5 minutes, the catalyst is deactivated with isopropanol. Seven grams of polymer are precipitated by methanol addition. This product contains 57% propylene, has an inherent viscosity of 3.49, and is completely soluble in cyclohexane (2 g./100 ml.) at 25° C.

(B) The procedure of part A is followed, except that the Lewis acid is omitted for purposes of comparison (the catalyst is therefore outside the scope of the invention). Following $VCl_4$ addition, an induction period of 1–2 minutes is observed. Partial catalyst agglomeration (heterogeneity) is noted. 6.1 grams of polymer having an inherent viscosity of 2.96 are isolated; as to both yield and inherent viscosity, this marks a decrease of about 15% compared to part A. The polymer contains 57% propylene and is partially insoluble in cyclohexane.

Example 2

(A) Ethylene and propylene are copolymerized by in situ formation of a $Zr(BH_4)_4/AlBr_3$-containing catalyst wherein the halovanadium component is $VOCl_3$. To a one-liter reaction vessel equipped as in Example 1 is added one liter of tetrachloroethylene. The solvent is saturated at 20° C. with ethylene (1.0 liter/min.) and propylene (1.5 liter/min.). To the vessel are then added in turn:

2 ml. of a cyclohexane solution of $Zr(BH_4)_4$ (3 g./100 ml. solution),
0.25 millimole $VOCl_3$ and
0.25 g. of $AlBr_3$.

The solution turns brown and polymerization begins immediately. After the reaction has occurred at 20° C. (with cooling) for 7.5 minutes, the catalyst is deactivated with isopropanol. The polymer, isolated by methanol precipitation, weighs 12.3 grams, contains 52.5% propylene, has an inherent viscosity of 4.33, and is completely soluble in cyclohexane (2 g./100 ml.).

(B) The general procedure of part A is followed, except that the Lewis acid is omitted for purposes of comparison (the catalyst is therefore outside the scope of the invention). To the vessel are added in turn:

10 ml. of a cyclohexane solution of $Zr(BH_4)_4$ (3 g./100 ml. solution), and
0.42 millimole $VOCl_3$.

The mole ratio $Zr(BH_4)_4/V$ is approximately 4.75/1. A purple color develops slowly, polymerization initiating in 1–2 minutes. After the reaction has proceeded at 35° C. for 15 minutes, the catalyst is deactivated with isopropanol. The copolymer, isolated by methanol precipitation, weighs 4.2 g., contains 75% propylene units, has an inherent viscosity of 3.67, and is only partially soluble in tetrachloroethylene. As compared to part A, wherein the Lewis acid was not omitted this run produced polymer in substantially lower yield and of substantially lower inherent viscosity, in spite of the fact that catalyst concentration was higher and the reaction time was twice as long as that in part A. Similar comparative results are obtained when the copolymerization is effected with a vanadium dibromo- or vanadium dichloro-bis-acetylacetonate-containing catalyst, and Lewis acid is alternatively employed or omitted.

Example 3

In this example cyclohexane is employed as the reaction medium rather than tetrachloroethylene. After 750 ml. of solvent has been saturated with ethylene at 1 liter/minute and propylene at 1.25 liter/minute, the following are added in turn:

3 ml. $Zr(BH_4)_4$ (3 g./100 ml. soln.),
0.10 g. $AlBr_3$, and
0.2 millimole $VCl_4$.

The molar ratio $Zr(BH_4)_4/V$/Lewis acid is approximately 3/1/1.87. Polymerization begins at once and is continued at 25° C. for about 15 minutes. The copolymer, isolated by methanol precipitation, weighs 7 g., contains 47% propylene, and has an inherent viscosity of 3.54. Similar results are obtained when hexane, octane or methylcyclohexane are employed as the solvent.

Example 4

An ethylene/propylene/1,4-hexadiene copolymer is produced using catalysts of the invention. To a 1-liter reaction vessel, equipped as in Example 1, are added 600 ml. of tetrachloroethylene and 4 ml. of 1,4-hexadiene. After the solvent has been saturated at 20° C. with ethylene (1.0 liter/min.) and propylene (1.5 liter/min.), the coordination catalyst is formed in situ by introducing, in turn:

4 ml. of a solution of $Zr(BH_4)_4$ in cyclohexane (3 g./100 ml. soln.),
0.5 millimole $VOCl_3$, and
0.5 g. of $AlBr_3$.

The molar ratio $Zr(BH_4)_4/V$/Lewis acid is approximately 1.6/1/3.74. For 15 minutes the mixture is stirred while monomer gas inflow continues at the initial rates at ambient temperature. The polymerization product is isolated by pouring the solution into methanol containing a few ml. of concentrated hydrochloric acid and drying the precipitated product in a vacuum oven. The copolymer obtained weights 3.75 g., exhibits an inherent viscosity of 2.34, is completely soluble in cyclohexane, and contains 41% propylene and 4.55% hexadiene units, the remainder being ethylene units.

Example 5

This example illustrates the enhanced efficiency obtained when aluminum trichloride solubilized by mixing with alkyl iodide is used in copolymerization of ethylene, propylene and 1,4-hexadiene. To a 1-liter reaction vessel, equipped as in Example 1, is added one liter of tetrachloroethylene. After this solvent has been saturated at 20° C. with ethylene (1.0 liter/min.) and propylene (1.5 liters/min.), the coordination catalyst is formed in situ by introducing, in turn:

4 ml. of a solution of $Zr(BH_4)_4$ in cyclohexane (3 g./100 ml. soln.),
4 ml. of 1,4-hexadiene,
0.5 millimole $VOCl_3$ and
4 ml. of a solution prepared by mixing 2.7 gm. of aluminum trichloride and 58 ml. of 1-iodoethane.

The mole ratio $Zr(BH_4)_4/V$/aluminum trichloride is approximately 1.6/1/2.8. For 15 minutes the mixture is stirred at 20° C. while monomer gas inflow continues at the initial rates. The polymerization product is isolated by pouring the solution into methanol (containing a few ml. of concentrated hydrochloric acid) and drying the precipitate in a vacuum oven. The copolymer obtained weighs 7.8 gm., exhibits an inherent viscosity of 3.49, is completely soluble in cyclohexane, and contains 34 weight percent propylene and 4.5% total hexadiene units, the remainder being ethylene units. It should be noted that, as compared to Example 4, polymer yield is more than doubled when alkyl iodide-solubilized aluminum trichloride is employed as the Lewis acid.

Example 6

Ethylene and propylene are copolymerized by in situ formation of a $Zr(BH_4)_4/VOCl_3$ catalyst which additionally contains aluminum trichloride solubilized by mixing with an alkyl iodide. To a 1-liter reaction vessel equipped as in Example 1 is added one liter of tetrachloroethylene. The solvent is saturated at 20° C. with ethylene (1.0 liter/min.) and propylene (1.5 liter/min.). To the vessel are then added, in turn:

3 ml. of a solution of $Zr(BH_4)_4$ in cyclohexane (3 g./100 ml. soln.),
0.25 millimole of $VOCl_3$, and
6 ml. of solution prepared by mixing 2.7 grams of $AlCl_3$ and 48 ml. of 1-iodoethane.

The mole ratio $Zr(BH_4)_4/V$/aluminum trichloride is approximately 2.4/1/8.4. The solution turns brown and poymerization begins immediately. After the reaction has occurred at 20° C. (with cooling) for 7.5 minutes, the catalyst is deactivated with a few milliliters of isopropanol. The polymer, isolated by methanol precipitation, weights 15.3 gm., contains 54% propylene, and has an inherent viscosity of 3.87. In additional runs according to the above general procedure, essentially similar results are obtained when the alkyl halide is successively 1-iodobutane, 2-iodobutane, 1-iodo-2-methylpropane, and 1-iodooctadecane.

Example 7

Ethylene/propylene copolymerization is catalyzed using an ether complex of aluminum borohydride. Aluminum trichloride (0.1 g.) is added to 500 ml. of tetrachloroethylene; after the resulting mixture has been agitated at 40–45° C. for 80 minutes, it is cooled to 25° C. and saturated with monomers by introduction of ethylene (1 liter/min.) and propylene (1.5 liter/min.). While monomer inflow and agitation are continued, a catalyst is made in situ by introduction (from syringes) of 1.0 ml. of 0.145 molar $Al(BH_4)_3 \cdot O(C_2H_5)_2$ in tetrachloroethylene and 2.5 ml. of 0.1 molar $VCl_4$ in tetrachloroethylene. The molar ratio $Al(BH_4)_3 \cdot O(C_2H_5)_2$/V/Lewis acid is approximately 0.58/1/3. The temperature rises to a maximum of 45° C. during the following 20 minutes. After the catalyst has been deactivated by addition of isopropanol to the viscous mixture, the solvent is evaporated to give 12.4 of rubber-like ethylene/propylene copolymer. Equally satisfactory results are obtained when in place of the diethyl ether complex is used, successively, dibutyl ether and tetrahydrofuran complexes of aluminum borohydride.

Example 8

Use of niobium pentachloride and unsolubilized aluminum trichloride is illustrated.

(A) A 0.3 g. portion of aluminum trichloride is added to one liter of agitated tetrachloroethylene saturated with ethylene (1.0 liter/min.) and propylene (1.5 liter/min.). The temperature is raised to 50° C. and 3 ml. of a solution of zirconium borohydride in cyclohexane (3 g./100 ml. soln.) are added. After the temperature has been lowered to 20° C., 0.25 millimole of vanadium oxytrichloride is added to the system. The molar ratio $Zr(BH_4)_4$/V/Lewis acid is approximately 2.4/1/9. A purple color occurs and polymerization begins at once. For 7.5 minutes the polymerization takes place at 20° C. (with cooling) while monomer inflow is continued at the above-described rates. The catalyst is then destroyed with methanol. The copolymer precipitated weighs 11.5 g., has an inherent viscosity of 5.94, and contains 62% propylene units.

(B) An agitated 1-liter charge of tetrachloroethylene at 26–28° C. in the apparatus of Example 1 is saturated with ethylene (2 liter/min.) and propylene (3 liter/min.). While monomer inflow continues as before, catalyst is made in situ by adding, in turn:

0.2 g. of niobium pentachloride,
0.25 millimole of $VCl_4$ (as a 0.4 M solution in tetrachloroethylene) and
2 ml. of a cyclohexane solution containing $Zr(BH_4)_4$ (3.5 g./100 ml. soln.).

The molar ratio $Zr(BH_4)_4$/V/Lewis acid is approximately 1.6/1/2.96. Not all the niobium pentachloride dissolves. A brown coloration occurs and a slow polymerization begins. The product, isolated as in Example 1, weighs 3.35 g. and contains 57% propylene units. The inherent viscosity is 3.31.

Example 9

This example illustrates the use of vanadium species other than the preferred $VCl_4$ and $VOCl_3$. A 1000-ml. portion of tetrachloroethylene in a 1-liter glass reaction vessel is saturated with ethylene (1.0 liter/min.) and propylene (1.5 liter/min.). The coordination catalyst is then formed by adding, in turn:

15 ml. of a cyclohexane solution of zirconium borohydride (3 g./100 ml. soln.),
0.2 g. of vanadium trichloride:3 tetrahydrofuran complex, and
0.6 g. of aluminum tribromide.

The molar ratio $Zr(BH_4)_4$/V/Lewis acid is approximately 5.6/1/4.17. The polymerization begins and heat is evolved. The polymerization is allowed to continue for 7.5 minutes during which time the temperature is in the range 42–47° C. A 12.4 g. amount of ethylene/propylene copolymer is isolated by precipitation with methanol. When the vanadium component is $VCl_2(OC_2H_5)_2$, $VCl_3(OC_3H_7)$, $$VOCl_2(OC_2H_5)$$

or $VOCl(OC_3H_7)_2$ similar results are obtained.

Example 10

This example illustrates an alternative method or procedure wherein the coordination catalyst is formed outside the polymerization solution. The following mixture is stirred under nitrogen for 30 minutes at room temperature:

20 ml. of a solution of $Zr(BH_4)_4$ in cyclohexane (3.24 g./100 ml. soln.),
50 ml. of a solution of $AlBr_3$ in tetrachloroethylene (1 g./100 ml. soln.), and
50 ml. of tetrachloroethylene.

The molar ratio $Zr(BH_4)_4$/V/Lewis acid is approximately 2.15/1/0.94. Subsequent addition of 5 ml. of a 0.4 molar solution of $VCl_4$ in tetrachloroethylene causes a series of color changes to occur as the active coordination catalyst forms. A 12.5 ml. (0.2 millimole vanadium) aliquot is introduced into a liter of agitated tetrachloroethylene (at 20° C.) which has been saturated with monomers by means of a gas feed supplying ethylene and propylene at 3 liter/min. and 2 liter/min., respectively. The resulting polymerization is continued at 20° C. for 7.5 minutes while monomers are supplied as before. Deactivation of the catalyst with isopropanol and precipitation of the polymer product with methanol gives an 8.4 g. yield.

Example 11

The effect of increasing concentration levels of Lewis acid on catalyst efficiency and inherent viscosity is demonstrated. In each of three runs there is added to a one liter vessel, equipped as in Example 1, one liter of tetrachloroethylene. The solvent is saturated at 20° C. with ethylene (1.0 liter/min.) and propylene (1.25 liter/min.). To the vessel are then added in turn 0.5 ml. of a solution of $Zr(BH_4)_4$ (11 g./100 ml. soln.),
0.25 millimole $VCl_4$, and
$AlBr_3$ in amounts specified in Table I, below.

Polymerization begins immediately. After the reaction has proceeded at 20° C. (with cooling) for 7.5 minutes, the catalyst is deactivated with isopropanol and the polymer isolated by methanol precipitation. Results are summarized:

TABLE I

| Run No.: | $AlBr_3$, grams | Mole ratio $Zr(BH_4)_4$/V/Lewis acid | Yield, grams | Percent propylene | $\eta$inh |
|---|---|---|---|---|---|
| A | 0.1 | 1.44/1/1.5 | 7.0 | 57 | 3.49 |
| B | 0.2 | 1.44/1/3 | 6.0 | 54 | 2.59 |
| C | 0.3 | 1.44/1/4.5 | 3.0 | 51 | 1.1 |

It should be noted that as Lewis acid increases, both yield and inherent viscosity decrease, as does the percentage of contained propylene.

Example 12

The effect of order of addition of catalyst components is illustrated.

(A) One liter of tetrachloroethylene at 20° C. is saturated with ethylene and propylene as in Example 9, and there is then added in turn:

2 ml. of a solution of $Zr(BH_4)_4$ in cyclohexane (3 g./100 ml. soln.),
0.25 millimole $VOCl_3$,
0.4 g. $AlBr_3$.

The mole ratio $Zr(BH_4)_4$/V/Lewis acid is approximately 1.6/1/6. After reaction for 7.5 minutes at 20° C., there is recovered 7.6 gm. copolymer, having an inherent viscosity of 3.53.

(B) The procedure of part A is repeated, except that the Lewis acid is added to solution before addition of the vanadium component. Only 3.5 g. polymer is produced, having inherent viscosity of 1.77. Each value is substantially lessened by the reversal in order of addition.

From the examples and disclosure above, it will be seen that the invention provides a soluble catalyst system capable of producing even at ambient temperature alpha-olefin-containing polymer in substantial yields of optimal inherent viscosity and solubility.

The precise manner in which the various components of the instant catalyst combine to produce catalytic activity is not presently capable of determination. Necessarily, then, the catalyst is defined in the claims as that resulting from the admixture of the various components.

We claim:
1. A catalyst mixture of:
   (a) an organic-soluble aluminum borohydride complexed with an agent selected from the group consisting of alkyl ethers having in each alkyl radical from 1 to about 20 carbon atoms, cycloalkyl ethers having in each cycloalkyl radical from 5 to about 7 carbon atoms, alkaryl ethers wherein the alkyl radical has from 1 to about 20 carbon atoms and the aryl radical has from 6 to about 20 carbon atoms, tetrahydrofuran, and tetrahydropyran;
   (b) an organic-soluble halovanadium compound selected from the group consisting of vanadium tetrachloride, vanadium oxytrichloride, vanadium dichloro-bis-acetylacetonate, vanadium dibromo-bis acetylacetonate, vanadium trichloro:3 tetrahydrofuran, $VCl_m(OC_nH_{2n+1})_{4-m}$ wherein $m$ is an integer from 1 to 3 and $n$ is an integer from 2 to 8, $VOCl_m(OC_nH_{2n+1})_{3-m}$, wherein $m$ is an integer from 1 to 2 and $n$ is an integer from 2 to 8 and mixtures thereof; and
   (c) a Lewis acid selected from the group consisting of aluminum tribromide, niobium pentachloride, aluminum trichloride, and alkyl halide-solubilized aluminum trichloride, wherein the molar ratio aluminum borohydride/vanadium/Lewis acid is 0.1–1.2/1/1–5, the borohydride and the halovanadium compound being mixed prior to addition of the Lewis acid thereto.

2. The catalyst system of claim 1 wherein the said alkyl halide is alkyl iodide.

3. The catalyst system of claim 2 wherein the borohydride is the diethyl ether complex of aluminum borohydride.

4. The catalyst system of claim 3 wherein the halovanadium compound is selected from the group consisting of vanadium tetrachloride and vanadium oxytrichloride.

5. The catalyst system of claim 4 wherein the molar ratio aluminum borohydride/vanadium/Lewis acid is 0.4–0.9/1/2–3.

6. The catalyst system of claim 5 wherein the selected Lewis acid is aluminum tribromide.

7. The catalyst system of claim 5 wherein the selected Lewis acid is alkyl iodide-solubilized aluminum trichloride.

References Cited

UNITED STATES PATENTS

| | | |
|---|---|---|
| 2,728,757 | 12/1955 | Field et al. _____ 252—432X |
| 2,892,826 | 6/1959 | Peters et al. |
| 2,996,494 | 8/1961 | Cash _____ 252—432X |
| 3,021,320 | 2/1962 | Zellner et al. |
| 3,166,536 | 1/1965 | Witt. |
| 3,189,589 | 6/1965 | Witt. |

FOREIGN PATENTS

| | | |
|---|---|---|
| 696,956 | 11/1964 | Canada. |
| 1,161,213 | 8/1958 | France. |
| 776,326 | 6/1957 | Great Britain. |

PATRICK P. GARVIN, Primary Examiner

U.S. Cl. X.R.

252—429C, 432; 260—88.8, 85.3